United States Patent [19]

Dalibor et al.

[11] 4,172,060

[45] Oct. 23, 1979

[54] REACTIVE LACQUER COMPOSITION BASED ON UNSATURATED POLYESTERS

[75] Inventors: Horst Dalibor, Norderstedt; Hans-Joachim Kiessling; Peter Quednau, both of Hamburg, all of Fed. Rep. of Germany

[73] Assignee: Hoechst Aktiengesellschaft, Fed. Rep. of Germany

[21] Appl. No.: 800,164

[22] Filed: May 25, 1977

[30] Foreign Application Priority Data

Oct. 2, 1976 [DE] Fed. Rep. of Germany ....... 2644550

[51] Int. Cl.$^2$ .................. C09D 3/72; C08L 75/06; C08G 18/62
[52] U.S. Cl. .................. 260/22 TN; 260/29.2 E; 260/31.2 N; 260/31.4 R; 260/32.8 N; 260/33.6 UB; 260/37 R; 428/425; 528/75; 525/34; 525/43; 525/127
[58] Field of Search ................. 260/77.5 CR, 77.5 AP, 260/22 TN, 859; 528/75

[56] References Cited

U.S. PATENT DOCUMENTS

| | | | |
|---|---|---|---|
| 3,245,941 | 4/1966 | Mayer et al. ..................... 260/31.6 |
| 3,349,049 | 10/1967 | Seiwert et al. ................. 260/22 TN |
| 3,455,857 | 7/1969 | Holzrichter ..................... 260/22 |
| 3,509,234 | 4/1970 | Burlant et al. ................. 260/22 TN |
| 3,853,822 | 12/1974 | Brod et al. .................... 260/77.5 CR |
| 3,933,760 | 1/1976 | Sekmakas et al. ............. 260/77.5 CR |
| 3,969,569 | 7/1976 | Vasta ............................. 260/77.5 CR |
| 3,970,717 | 7/1976 | Mueller-Albrecht et al. ..... 260/77.5 CR |
| 4,020,216 | 4/1977 | Miller ............................. 260/22 TN |
| 4,107,101 | 8/1978 | Kubens .......................... 260/859 R |

*Primary Examiner*—H. S. Cockeram
*Attorney, Agent, or Firm*—Gordon W. Hueschen

[57] ABSTRACT

A reactive lacquer composition comprising hydroxyl containing polymers, a polyisocyanate, a solvent having no active hydrogen atoms, wherein the binder of the lacquer composition contains (A) 60 to 80 percent of a copolymer of
  (a) unsaturated polyesters having acid number of 10 to 20 and hydroxyl numbers of 100 to 250, which polyesters are prepared from saturated dicarboxylic acids or anhydrides thereof and diols having 2 to 15 carbon atoms, it being possible to replace up to 20 percent of the saturated dicarboxylic acids with saturated dimeric fatty acids which have 36 carbon atoms and contain two carboxyl groups, and
  (b) a mixture of monomers, consisting of ($b_1$) styrene or methyl methacrylate, and ($b_2$) at least one of hydroxylethyl acrylate, hydroxyethyl methacrylate, hydroxypropyl acrylate, and hydroxy-n-butyl acrylate, and (B) 20 to 40 percent of an organic polyisocyanate.

4 Claims, No Drawings

REACTIVE LACQUER COMPOSITION BASED ON UNSATURATED POLYESTERS

BACKGROUND OF THE INVENTION

(1) Field of the Invention

It is an object of the present invention to provide a process for the production of coatings, wherein the sheet-like structures which can be produced therefrom have considerably improved properties in various respects. This includes the property that the lacquer which has been applied to a metallic substrate and which contains the copolymer solution in combination with organic polyisocyanates, shall, after drying in the air for three to four days at temperatures of about 20° C., cure in such a way that the film no longer swells under the influence of water and also cannot be removed mechanically by scratching, even if the film is exposed to water for a brief period at temperatures of 50°–70° C.

It is a further object of the present invention to use in the reactive laquer such an acrylic resin, containing hydroxyl groups, which, in combination with polyisocyanates, provides the binder foundation for air-drying lacquers and also stoving lacquers which are suitable for top coats of lacquer in the automobile industry, the lacquer being present after stoving in layer thicknesses of about 40 to 80 μm and the top lacquer being located directly on top of the stoved primer of electrocoating lacquer.

In the modern methods of the present time for lacquering motor vehicles in the automobile factory, the coachwork parts are usually provided, after phosphating, with a primer of electrocoating lacquer and the latter is stoved to give a plastic coating. A spraying lacquer or a coating composition, which is usually designated a filler, is then applied to this plastic coating, usually by a spray process, and is again stoved.

The pigmented formulation of automobile lacquer is then applied, in the desired pigmentation, to this two-layer coat of lacquer or primer, by spraying, and the automobile body is stoved again.

The complete coating, which, as explained above, consists of three layers, has a layer thickness of 70–100 μm after stoving, of which the proportion relating to the outer layer of top lacquer is 30 to 40 μm. In the course of methods of rationalisation in the automobile industry efforts are being made to change over from the three-layer system to a two-layer build-up. In this, the electrocoating lacquering or another equivalent primer is intended to form the first coating layer and the final lacquering with the pigmented lacquer is intended to be built up thereafter, the total thickness of the layers applied being intended, however, to have the same layer thickness. Using the conventional automobile top lacquers, however, it is not possible to produce, from pigmented lacquer formulations in the customary spraying and stoving treatment, coatings of a type which, after drying in the air or after stoving, give lacquer films which are completely uniform (that is to say free from so-called curtaining and free from craters and blisters).

In addition, the less viscous copolymer solutions used according to the invention exhibit a better absorption of pigment both when using inorganic pigments, such as, for example, titanium dioxide, or organic pigments, such as, for example, carbon black. When titanium dioxide is used as the pigment, the copolymers used according to the invention, and also the reactive lacquer manufactured therefrom, still produce high-gloss films at a pigment/binder ratio of 1.5 to 2:1, whilst the known copolymers and the known reactive lacquers manufactured therefrom exhibit a distinct falling off in gloss at the same level of pigmentation. In addition, it has been found that the copolymers used according to the invention and the reactive lacquers manufactured therefrom produce high-gloss lacquers with carbon black, whilst the known copolymers and the reactive lacquers manufactured therefrom display matt films at the same level of pigmentation.

(2) Prior Art

Numerous proposals have been disclosed to manufacture solvent-resistant and alkali-resistant lacquers by reacting polyisocyanates and copolymers containing hydroxyl groups and to convert them into coatings. DT-AS 1,247,006 describes a process for the production, by the polyisocyanate polyaddition process, of alkali-resistant sheet-like structures which are obtained from copolymers containing hydroxyl groups, and polyisocyanates, but which are not adequately water-resistant after a reaction time of three to four days at 20° C. These coatings, obtained by this known process, are, therefore, not suitable as top lacquers for external lacquering which are resistant to weathering, since blistering takes place after a very short time and the adhesion of the lacquer to the various metallic substrates falls off and as a result, the lacquer comes away from the substrate.

It is also known that polyhydroxy compounds of polyols can be cured with polyisocyanates in order to obtain cross-linked lacquer coatings with good resistance properties. These combinations also display too low a resistance to water and a fairly low resistance to weathering of the cured lacquer films.

It cannot, however, be inferred from the state of the art that the choice of specified solvents and a specified quantity range of a combination of various polymerisable monomers and the use of a combination of initiators makes it possible to manufacture copolymer solutions which have a substantially higher solids content and which open up the use of the new copolymers as binders for lacquer systems which are based on acrylates and have a low solvent content.

It is found, surprisingly, that the copolymers which are used according to the invention and have a hydroxyl number of 130 to 200, preferably 140 to 165, give lower viscosities than the known copolymers which have the same hydroxyl numbers. Thus, in a 60% strength by weight solution in aromatic hydrocarbons/ethylglycol acetate, the copolymer solutions used according to the invention have viscosities of G to X, preferably H to U, measured by the Gardner-Holdt method at 20° C. In this way the copolymer solutions used according to the invention take account of the demands of environmental protection for binders of high solids content and low solvent content.

Compared with the known reactive lacquer films based on copolymers and polyisocyanates, the films of the reactive lacquers used in the process of the invention have the following advantages: better resistance to solvents, higher abrasion resistance and better resistance to weathering in the Florida climate. In addition, the copolymers used according to the invention, when combined with polyisocyanates and diluted with acetone, xylene or butyl acetate to a viscosity of 25 seconds at 25° C., measured in a DIN cup having a 4 mm flow orifice, give lacquers of higher solids content which have a solids content of 50 to 65% by weight, preferably from 55 to 63% by weight, in the clear lacquer. When such clear lacquers or pigmented lacquers are applied to steel sheets by spray application and are exposed to the air for a brief period and subsequently stoved, high dry film layer thicknesses of 70 to 80 μm are obtained, which do not exhibit crater-formation or blistering.

SUMMARY

The subject of the invention is a process for the production of coatings from polyhydroxy compounds, based on copolymers containing hydroxyl groups, and polyisocyanates in solvents having no active hydrogen atoms, by shaping whilst removing the solvent, characterised in that A. 60–80% by weight of copolymers which contain hydroxyl groups and have hydroxyl numbers of 130 to 200 and which are manufactured from:
  (a) 20 to 45% by weight of unsaturated polyesters having acid numbers of 10 to 20 and having hydroxyl numbers of 100–250, which are synthesised from saturated dicarboxylic acids having 6–10 carbon atoms, unsaturated dicarboxylic acids having 4 carbon atoms or the anhydrides thereof and diols having 2–15 carbon atoms, it being possible for the saturated dicarboxylic acids having 6–10 carbon atoms to be replaced, to the extent of up to 20%, by saturated, dimeric fatty acids which have 36 carbon atoms and contain two carboxyl groups, together with
  (b) 55–80% by weight of a mixture of monomers composed of α,β-ethylenically unsaturated compounds, it being necessary that the % by weight of unsaturated polyester and the % by weight of the mixture of monomers add up to 100% by weight, the said mixture consisting of
    ($b_1$) 50–70% by weight of styrene and/or methyl methacrylate and
    ($b_2$) 30–50% by weight of hydroxyethyl acrylate and/or hydroxyethyl methacrylate and/or hydroxypropyl acrylate and/or hydroxy-n-butyl acrylate, the components (a) and (b) having been employed in such quantities that their total adds up to 100% by weight and it being necessary that the components ($b_1$) and ($b_2$) in the mixture (b) of monomers add up to 100% by Weight, and the additional condition applying that the components (a) and (b) have been employed in such quantities that the copolymers have hydroxyl numbers of 130 to 200, and B. 20–40% by weight of an organic polyisocyanate are employed, it being necessary that (A) and (B) together give numerical values of 100% by weight.

A further embodiment of the above process is characterised in that

A. 63–68% by weight of the copolymers which contain hydroxyl groups and

B. 32–37% by weight of an organic triisocyanate which has been obtained by reacting 3 mols of hexamethylene diisocyanate and 1 mol of water, are employed, it being necessary that (A) and (B) together give numerical values of 100% by weight.

A particularly preferred embodiment is characterised in that the component (A) is employed in the form of a solution consisting of 20–35% by weight of inert organic solvents which are customary in the lacquer industry and 65–80% by weight of copolymers, it being necessary that the % by weight add up to 100%.

A particularly preferred embodiment of the process of the invention is characterised in that the component (A) which is employed consists of a copolymer which has a hydroxyl number of 140 to 175 and which has been manufactured from a mixture consisting of:
  (a) 20–45% by weight of unsaturated polyesters having hydroxyl numbers of 150–240, formed from 28–60% by weight of saturated dicarboxylic acids having 6 to 10 C atoms, 2–20% by weight of unsaturated dicarboxylic acids having 4 C atoms or the anhydrides thereof and 38–70% by weight of diols having 2–4 C atoms, it being necessary that the % by weight add up to 100% by weight, and
  (b) 55–80% by weight of a mixture of monomers composed of α,β-ethylenically unsaturated compounds.

The manufacture of the copolymers and copolymer solutions employed in the process has been described in greater detail in the German patent application of the same date entitled "Copolymer solution of acrylic resin, process for its manufacture and the use thereof in reactive lacquers." The copolymerisation is carried out by heating the components in inert solvents in the presence of polymerisation initiators.

The inert solvents with no active hydrogen atoms which are used are the organic solvents which are customary in the lacquer industry, individually or as mixtures, such as, for example, acetone, methyl ethyl ketone, methyl isobutyl ketone or cyclohexanone, ethyl acetate, butyl acetate, glycol monomethyl ether-acetate, glycol monoethyl ether-acetate, glycol monobutyl ether-acetate, acetoacetic acid methyl ester, acetoacetic acid ethyl ester, acetoacetic acid butyl ester, benzene, toluene, xylene and/or mixtures of aromatic solvents having a boiling range of 150° to 200° C.

Preferred organic inert solvents are those which, individually or as mixtures, have a boiling range of 150° to 200° C. These include, for example, ethylglycol acetate, acetoacetic acid methyl ester, acetoacetic acid ethyl ester and mixtures of aromatic solvents having a boiling range of 150° to 180° C. Ethylglycol acetate is particularly suitable for the manufacture of the copolymers A. It can be removed, partly or wholly, by distillation and can be replaced by low boiling solvents which have a better solubility for the copolymers used. The following are particularly suitable for this purpose: acetone, methyl ethyl ketone, methyl isobutyl ketone, ethyl acetate and butyl acetate.

Unsaturated polyesters which are synthesised from saturated dicarboxylic acids having 6 to 10 carbon atoms, saturated, dimeric fatty acids which have 36 carbon atoms and contain two carboxyl groups in the molecule, unsaturated dicarboxylic acids having 4 carbon atoms or the anhydrides thereof and diols having 2–15 carbon atoms, are obtained as the component (a). Saturated dicarboxylic acids which can be used are adipic acid, pimelic acid, azelaic acid, sebacic acid, phthalic acid, isophthalic acid, terephthalic acid, tetrahydrophthalic acid, hexahydrophthalic acid, endomethylenetetrahydrophthalic acid and methyl-endomethylenetetrahydrophthalic acid or the anhydrides thereof. The cycloaliphatic dicarboxylic acids tetrahydrophthalic acid or hexahydrophthalic acid or the anhydrides thereof, which impart a high resistance to weathering to the copolymers, especially in two-coat metal effect lacquers, are preferred. Maleic acid, maleic anhydride, fumaric acid and the partially or completely isomerised forms which are produced in the manufacturing process, starting from maleic acid or maleic anhydride, are used as the unsaturated dicarboxylic acids having 4 carbon atoms. Ethylene glycol, 1,2-propylene glycol, 1,3-propylene glycol, butane-1,3-diol, butane-1,4-diol, neopentyl glycol, 2,2,4-trimethylpentane-1,3-diol and 4,4'-dihydroxyisopropylidenedicyclohexane are used as the diols. Ethylene glycol, 1,2-propylene glycol, neopentyl glycol and 2,2,4-trimethylpentane-1,3-diol are particularly preferred.

The mixture of monomers of the $\alpha,\beta$-unsaturated compounds contains the following compounds: styrene and/or methyl methacrylate are used as ($b_1$). 30 to 50% by weight of hydroxyethyl acrylate and/or hydroxyethyl methacrylate and/or 2-hydroxypropyl acrylate and/or hydroxy-n-butyl acrylate and/or 2-hydroxypropyl methacrylate and/or hydroxy-n-butyl methacrylate are employed as the component ($b_2$).

The hydroxyalkyl acrylates mentioned impart a high degree of elasticity to the copolymers. This is required particularly where the metal substrates are shaped by an impact process. A further outstanding property of the hydroxyalkyl acrylates in the copolymers used consists in promoting the wetting of pigments, especially with organic pigments and carbon black. Hydroxyalkyl methacrylates give the copolymers used a particularly high degree of film hardness, which is required particularly in the formation of polyisocyanate reactive clear lacquers for two-coat metal effect lacquering.

30 to 50% by weight of hydroxyethyl acrylate and/or hydroxyethyl methacrylate are used particularly preferentially as the component ($b_2$) since they produce particularly low viscosities and a high solids content in the state ready for spraying.

Mixtures of peroxides, consisting of at least two peroxides, are used as the polymerisation initiators in the manufacture of the copolymers used. The mixtures of peroxides have various chemical structures. Peroxides of the first group are represented by diacyl peroxides, such as dibenzoyl peroxide, or peresters, such as tert.-butyl perbenzoate, tert.-butyl peroctoate or tert.-butyl perisononanate. Peroxides of the second group are represented by alkyl hydroperoxides, such as tert.-butyl hydroperoxide and cumene hydroperoxide or dialkyl peroxides, such as di-tert.-butyl peroxide or dicumyl peroxide. 1 to 3.5% by weight of a peroxide from the first group and 1 to 3% by weight of a peroxide from the second group, relative to 100% by weight of the components (a) and (b) are used in each case as the peroxide mixtures.

The following combinations of peroxides from groups one and two are employed: dibenzoyl peroxide/tert.-butyl hydroperoxide, dibenzoyl peroxide/cumene hydroperoxide, dibenzoyl peroxide/dicumyl peroxide, tert.-butyl perbenzoate/butyl hydroperoxide, tert.-butyl perbenzoate/cumene hydroperoxide, tert.-butyl perbenzoate/di-tert.-butyl peroxide, tert.-butyl perbenzoate/dicumyl peroxide, tert.-butyl peroctoate/tert.-butyl hydroperoxide, tert.-butyl peroctoate/cumene hydroperoxide, tert.-butyl peroctoate/di-tert.-butyl peroxide, tert.-butyl peroctoate/dicumyl peroxide, tert.-butyl perisononanate/tert.-butyl hydroperoxide, tert.-butyl-perisononanate/cumene hydroperoxide, tert.-butyl perisononanate/di-tert.-butyl peroxide or tert.-butyl perisononanate/dicumyl peroxide.

The preferred embodiment includes the following combinations of peroxides: dibenzoyl peroxide/cumene hydroperoxide, dibenzoyl peroxide/di-tert.-butyl peroxide, tert.-butyl peroctoate/cumene hydroperoxide, tert.-butyl peroctoate/di-tert.-butyl peroxide, tert.-butyl perbenzoate/cumene hydroperoxide and tert.-butyl perbenzoate/di-tert.-butyl peroxide.

Mixtures of peroxides which contain 1.0 to 2.5% by weight of dibenzoyl peroxide and 1.5 to 3.0% by weight of di-tert.-butyl peroxide, relative to 100% by weight of the unsaturated polyester (a) and of the mixture (b) of monomers, are the most preferred embodiment.

The mixtures of peroxides are generally dissolved in the monomers or are added separately to the polymerisation medium, solvent or solvent mixture. In some cases it is also possible to dissolve small proportions of the mixtures of peroxides, up to 20% by weight of the quantity of peroxides employed, in the solvent or solvent mixtures and to add the residual quantity of the mixtures of peroxides uniformly to the polymerisation medium, solvent or solvent mixture, separately from the monomers or dissolved in the latter. The acid number of the copolymers is 4 to 10 and depends on the polyester constituent and on the organic acids which are formed as a scission product in the decomposition of the peroxides and which are to be regarded as extraneous acid.

The hydroxyl number of the copolymers is 130 to 200, preferably 140 to 175.

The copolymers (A) which are used are manufactured by copolymerisation, by heating at 165° to 180° C., the solvents or solvent mixtures, which preferably have a boiling range of 150° to 200° C., together with (a) 20 to 45% by weight of unsaturated polyesters having acid numbers of 10 to 20 and having hydroxyl numbers of 100–250, which are synthesised from saturated dicarboxylic acids having 6–10 carbon atoms, unsaturated dicarboxylic acids having 4 carbon atoms or the anhydrides thereof and diols having 2 to 15 carbon atoms, it being possible for the saturated dicarboxylic acids having 6 to 10 carbon atoms to be replaced, to the extent of up to 20%, by saturated, dimeric fatty acids which have 36 carbon atoms and contain two carboxyl groups, together with (b) 55–80% by weight of a mixture of monomers composed of α,β-ethylenically unsaturated compounds, it being necessary that the percentage by weight of unsaturated polyester and the percentage by weight of the mixture of monomers add up to 100% by weight, the said mixture consisting of (b₁) 50–70% by weight of styrene and/or methyl methacrylate and (b₂) 30–50% by weight of hydroxyethyl acrylate and/or hydroxyethyl methacrylate and/or hydroxypropyl acrylate and/or hydroxy-n-butyl acrylate, the components (a) and (b) having been employed in such quantities that their total adds up to 100% by weight and it being necessary that the components (b₁) and (b₂) in the mixture (b) of monomers add up to 100% by weight, and the additional condition applying that the components (a) and (b) have been employed in such quantities that the copolymers have hydroxyl numbers of 130 to 200, and employing a mixture of peroxides as polymerisation initiators. It is preferable to carry out the polymerisation in such a way that the mixture of polyester and solvent mixture is heated at 165° to 180° C. and the mixture of monomers (b₁) and (b₂) and the polymerisation initiators, separately or, preferably, jointly, are added slowly and uniformly, over a space of time of 4 to 10 hours to this heated mixture in the reaction vessel, the mixture not being allowed to fall below the polymerisation temperature of 165° C. After the monomers and peroxides have been added, polymerisation is continued for a further 2 to 3 hours at reflux temperature until the solids content of the solution has reached the theoretical value between 65 and 75% by weight. The copolymers used must have a predetermined test viscosity of H to W, measured by the Gardner-Holdt method, for 60% strength by weight copolymer solutions in ethylglycol acetate.

These copolymers A are used as the component A in reactive lacquers together with a polyisocyanate component B.

The following polyisocyanates, for example, can be employed as the component B: ethylene diisocyanate, propylene diisocyanate, tetramethylene diisocyanate, hexamethylene diisocyanate, 1,3-dimethylbenzene diisocyanate, 1,4-dimethylcyclohexane diisocyanate, 1-methylcyclohexane-2,4-diisocyanate, 4,4'-methylenebis(cyclohexyl diisocyanate), phenylene diisocyanate, 2,4-toluylene diisocyanate, naphthylene diisocyanate, 3-isocyanatomethyl-3,5,5-trimethylcyclohexyl isocyanate, lysine diisocyanate, triphenylmethane triisocyanate, trimethylbenzene-2,4,6-triisocyanate, 1-methylbenzene-2,4,6-triisocyanate and diphenyl-2,4,4'-triisocyanate; diisocyanates or triisocyanates which are manufactured by reacting a polyisocyanate with a low-molecular diol or triol (for example ethylene glycol, propylene glycol, 1,3-butylene glycol, neopentyl glycol, 2,2,4-trimethyl-1,3,-pentanediol, hexanediol, trimethylolpropane or trimethylolethane); and cyanurates which have been obtained by reacting the said diisocyanates so as to form a ring. A particularly valuable polyisocyanate is the triisocyanate which contains biuret groups and which is obtained by reacting 3 mols of hexamethylene diisocyanate and one mol of water.

Instead of the polyisocyanates, it is also possible to use compounds which split off polyisocyanates, and also reaction products, containing isocyanate groups, of polyhydric alcohols with polyisocyanates, for example the reaction product of 1 mol of trimethylolpropane with 3 mols of toluylene diisocyanate, and also trimerised or polymerised isocyanates such as are described, say, in German Patent Specification 951,168.

In addition, a reaction product from 1 mol of water and 3 mols of hexamethylene diisocyanate, having a NCO content of 16–17% by weight is also suitable. The last-mentioned reaction product from water and hexamethylene diisocyanate is particularly preferred. The NCO content of the reaction product applies to a 75% strength solution in xylene/ethylglycol acetate.

When they are used in reactive lacquers, the reaction of the copolymers A which contain hydroxyl groups, with the organic polyisocyanates B can, depending on the end use of the reaction products, be carried out with 0.5 to 1.3 NCO groups per hydroxyl group. The reaction is preferably carried out in such a way that the quantities of the organic polyisocyanate, relative to the total hydroxyl content of the components present in the reaction mixture, are present in a quantity of 0.7 to 1.0 isocyanate group per hydroxyl group.

In order to use the copolymers, the mixtures of copolymers A containing solvents and containing hydroxyl groups and of polyisocyanate B are applied to the appropriate substrates in the simplest manner imaginable, by spraying, dipping, pouring, brushing or other suitable measures, possibly after the addition of known auxiliaries, such as levelling agents, pigments or dyestuffs, and the sheet-like structures are dried at room temperature; in special cases, say when using compounds which split off isocyanate, stoving of the coatings can be carried out, which depends essentially on the substrates used and on the demands made on the coatings by practical use.

For the production of coatings or coverings, the copolymers used in the process can be employed in the reactive lacquers already illustrated, together with polyisocyanates, on substrates of the most diverse kind, for example porous or non-porous substrates such as textile nonwovens, leather or plastics. The production of coatings on wood or metals should be singled out particularly. In all cases, high-gloss, pore-free, elastic and solvent-resistant coatings of high surface hardness are obtained, which can be treated both with strong inorganic acids and with strong alkalis, without the coatings being attacked even to the slightest extent. In addition, coatings of this type exhibit an outstanding resistance to weathering and resistance to yellowing.

In pigmented coating compositions based on the polyisocyanate/reactive lacquer/binder solutions according to the invention, the total content of solids in the coating composition is between 60 and 80% by weight, preferably between 65 and 80% by weight. The ratio of pigment to binder can be between 1:20 and 2:1. The following can be added as pigments: inorganic pigments, such as chrome yellow, Prussian blue, Brunswick green and titanium pigments, for example titanium dioxide, extended titanium pigments (which are extended either with precipitated or natural extenders, such as alkaline earth metal sulphates, for example calcium sulphate and barium sulphate), tinted titanium pigments and titanates, such as barium, tin, lead and magnesium titanates. Other types of inorganic pigments can also be used, for example zinc sulphide pigments, such as zinc sulphide, lithopone, extended zinc sulphide pigments, such as lithopone with a calcium base, or zinc sulphide extended with natural extenders, zinc oxide or antimony oxide, or organic pigments, that is to say organic dyestuffs which are free from sulphonic acid or carboxylic acid groups, or other groups which impart solubility in water. Pigments also include, conceptually, other water-insoluble organic dyestuffs, for example calcium or barium lakes of azo dyestuffs.

The ingredients for the stoving lacquers to be used can be processed to give lacquers by customary processes, preferably as follows. The pigment and a suitable quantity of solvent are mixed with a part of the copolymer according to the invention to give a pasty or solid pigment paste. After the mixture has been well dispersed in a stirred ball mill, the residual copolymer and other additives are added to the resulting paste or dispersion and the product is then formulated with the solvents, preferably xylene, butyl acetate and/or ethylglycol acetate or acetone, to give a sprayable viscosity at a solids content of 60 to 80% by weight, preferably between 65 and 80% by weight, relative to the non-volatile substances.

Manufacture of the polyesters

A. 0.66 g of sodium acetate, 1,322 g of tetrahydrophthalic anhydride, 191 g of maleic anhydride and 1,140 g of 1,2-propylene glycol are heated under nitrogen, at first slowly to about 160° C. in order to prevent losses of glycol, in a glass flask equipped with a stirrer, a reflux condenser and a water separator. The mixture is heated further until, at a kettle temperature of about 180° C., separation of water takes place. As a result of further heating, during an esterification time of 15 hours, the kettle temperature rises to about 210° to 220° C. The unsaturated polyester has an acid number of 15 and a viscosity of H - I on the Gardner-Holdt scale, measured as a 70% strength solution in ethylglycol acetate at 23° C.

The following polyesters B to S are obtained according to these manufacturing instructions, but using other raw materials or other quantities of raw material:

Table 1

| Polyester | MA+ in % by weight | PA++ in % by weight | Iso-PS+++ in % by weight | Adipic acid in % by weight | Tetrahydro-PA in % by weight | Ethylene glycol in % by weight | 1,2-Propylene glycol in % by weight | 1,4-Butanediol in % by weight | 4,4'-Dihydroxy-isopropylidene-dicyclohexane in % by weight |
|---|---|---|---|---|---|---|---|---|---|
| B | 2 | 59.5 | | | | 38.5 | | | |
| C | 4 | 57.4 | | | | 38.6 | | | |
| D | 6 | 55.4 | | | | 38.6 | | | |
| E | 8 | 53.4 | | | | 38.6 | | | |
| F | 10 | 51.4 | | | | 38.6 | | | |
| G | 14 | 45.4 | | | | 40.6 | | | |
| H | 18 | 40.7 | | | | 41.3 | | | |
| I | 7.3 | 49.1 | | | | | 43.6 | | |
| J | 7.2 | 24.4 | | | 25 | | 43.4 | | |
| K | 7.32 | 24.64 | | 24.33 | | | 43.71 | | |
| L | 6.88 | | 52 | | | | 41.12 | | |
| M | 2.2 | 46.6 | | | | | | | |
| N | 2.3 | 49.9 | | | | | | 47.8 | |
| O | 2.5 | 34.8 | | | | | | | |
| P | 2.0 | 28.1 | | | | | | | 69.9 |
| Q | 6.8 | 20.2 | | 22.6 | | | 40.4 | | |
| R | | 24.3 | | 24.0 | | | 43.1 | | |
| S | 6.7 | 22.5 | | | | | 40.0 | | |

| Polyester | Neopentyl glycol in % by weight | 2,2,4-Trimethylpentane-1,3-diol in % by weight | Fumaric acid in % by weight | Sebacic acid in % by weight | Dimeric fatty acid having 36 C atoms in % by weight | Acid number | OH number | Viscosity in ethylglycol acetate at 70% solids content |
|---|---|---|---|---|---|---|---|---|
| B | | | | | | 14 | 220 | E-F |
| C | | | | | | 13 | 218 | G-H |
| D | | | | | | 15 | 208 | H-I |
| E | | | | | | 17.5 | 200 | I |
| F | | | | | | 16 | 195 | J |
| G | | | | | | 16 | 230 | I |

Table 1-continued

| | | | | | | | |
|---|---|---|---|---|---|---|---|
| H | | | | | 18 | 230 | I |
| I | | | | | 16 | 200 | L–M |
| J | | | | | 15 | 198 | I–J |
| K | | | | | 15 | 205 | D–E |
| L | | | | | 16 | 200 | I–U |
| M | 51.2 | | | | 12 | 195 | M–I |
| N | | | | | 20 | 160 | U |
| O | | 62.7 | | | 19 | 170 | Q–R |
| P | | | | | 19 | 175 | R |
| Q | | | | 10 | 12 | 170 | E |
| R | | | 8.6 | | 12 | 175 | E |
| S | | | | 30.8 | 13 | 180 | D |

+Maleic anhydride
++Phthalic anhydride
+++Isophthalic anhydride

MANUFACTURE OF COPOLYMERS 1–30

Copolymer 1:

322 g of an aromatic solvent having a boiling range of 150° to 170° C., 108 g of ethylglycol acetate and 400 g of the unsaturated polyester A (=40% by weight) are heated to reflux temperature in a flask equipped with a stirrer, a reflux condenser and a water separator, and the following mixture b of monomers (=60% by weight) consisting of: 235 g of hydroxyethyl methacrylate, 100 g of styrene, 265 g of methyl methacrylate, 20 g of dibenzoyl peroxide, as a 75% strength suspension in water, and 20 g of di-tert.-butyl peroxide is added uniformly in the course of 7 hours, the temperature of reflux falling from 162° C. to 145° C. during the addition. When the addition is complete, polymerisation is continued for a further 2 hours until the solids content of 68 to 69% is reached. The product has a viscosity on the Gardner-Holdt scale of Q, measured as a 60% strength solution at 23° C., after being diluted with ethylglycol acetate. The copolymer has an acid number of 5 and a hydroxyl number of 155.

Table 2

In the manufacture of copolymers 2–30 which follow, the process used is that described for the manufacture of copolymer 1.

| Copolymer No. | Polyester type | Polyester | Methyl methacrylate | Styrene | Hydroxyethyl methacrylate | Hydroxyethyl acrylate |
|---|---|---|---|---|---|---|
| 2 | B | 200 g | | 435 g | 365 g | |
| 3 | B | 300 g | | 400 g | 300 g | |
| 4 | B | 400 g | | 355 g | 245 g | |
| 5 | C | 200 g | | 435 g | 365 g | |
| 6 | C | 400 g | | 355 g | 245 g | |
| 7 | D | 200 g | | 435 g | 365 g | |
| 8 | D | 400 g | | 355 g | 245 g | |
| 9 | E | 200 g | | 435 g | 365 g | |
| 10 | E | 400 g | | 355 g | 245 g | |
| 11 | F | 200 g | | 435 g | 365 g | |
| 12 | F | 400 g | | 355 g | 245 g | |
| 13 | G | 200 g | | 435 g | 365 g | |
| 14 | G | 400 g | | 355 g | 245 g | |
| 15 | H | 200 g | | 435 g | 365 g | |
| 16 | H | 400 g | | 355 g | 245 g | |
| 17 | I | 400 g | 265 g | 100 g | 235 g | |
| 18 | I | 400 g | 291 g | 100 g | | 209 g |
| 19 | J | 400 g | 265 g | 100 g | 235 g | |
| 20 | J | 400 g | 291 g | 100 g | | 209 g |
| 21 | K | 400 g | 265 g | 100 g | 235 g | |
| 22 | K | 400 g | 291 g | 100 g | | 209 g |
| 23 | A | 400 g | | 365 g | 235 g | |
| 24 | A | 400 g | | 391 g | | 209 g |
| 25 | L | 400 g | 265 g | 100 g | 235 g | |
| 26 | L | 400 g | 291 g | 100 g | | 209 g |
| 27 | Q | 400 g | 270 g | 100 g | 230 g | |
| 28 | R | 410 g | 260 g | 90 g | 240 g | |
| 29 | S | 380 g | 230 g | 150 g | 240 g | |
| 30 | S | 400 g | 265 g | 100 g | 235 g | |

| Copolymer No. | Dodecylmercaptan | Di-tert.-butyl peroxide | Dibenzoyl peroxide, 75% strength in water | Hydroxyl number of the copolymer | Viscosity of the copolymers as a solution of 60% solids content after being diluted with ethylglycol acetate | Solids content of the copolymer solutions in % by weight |
|---|---|---|---|---|---|---|
| 2 | 16 g | 20 g | 20 g | 190 | R–S | 69 |
| 3 | 16 g | 20 g | 20 g | 188 | N | 68.5 |
| 4 | 16 g | 20 g | 20 g | 186 | I–J | 70 |
| 5 | 16 g | 20 g | 20 g | 187 | O–P | 69 |

Table 2-continued

| | | | | | | |
|---|---|---|---|---|---|---|
| 6 | 16 g | 20 g | 20 g | 176 | H-I | 70 |
| 7 | 16 g | 20 g | 20 g | 179 | T-U | 68.5 |
| 8 | 16 g | 20 g | 20 g | 178 | I-J | 69 |
| 9 | 16 g | 20 g | 20 g | 171 | T+ | 69.5 |
| 10 | 16 g | 20 g | 20 g | 165 | M+ | 68.5 |
| 11 | 16 g | 20 g | 20 g | 174 | T-U | 70 |
| 12 | 16 g | 20 g | 20 g | 165 | R-S | 69.5 |
| 13 | 16 g | 20 g | 20 g | 175 | U-V | 70 |
| 14 | 16 g | 20 g | 20 g | 178 | T-U | 69.5 |
| 15 | 16 g | 20 g | 20 g | 179 | W- | 69 |
| 16 | 16 g | 20 g | 20 g | 171 | V-W | 69 |
| 17 | | 20 g | 20 g | 155 | H-I | 70 |
| 18 | | 20 g | 20 g | 160 | I | 68.5 |
| 19 | | 20 g | 20 g | 162 | J | 69 |
| 20 | | 20 g | 20 g | 165 | M-N | 69.5 |
| 21 | | 20 g | 20 g | 165 | H-I | 69.5 |
| 22 | | 20 g | 20 g | 162 | T | 69.5 |
| 23 | | 20 g | 20 g | 158 | T-U | 68.5 |
| 24 | | 20 g | 20 g | 160 | X | 69 |
| 25 | | 20 g | 20 g | 150 | L-M | 70 |
| 26 | | 20 g | 20 g | 152 | K | 69.5 |
| 27 | | 20 g | 20 g | 148 | G | 69.5 |
| 28 | | 20 g | 20 g | 155 | H-I | 70 |
| 29 | | 20 g | 20 g | 162 | H | 68.5 |
| 30 | | 20 g | 20 g | 158 | H | 69.5 |

Copolymers 1-30, which are illustrated in Table 2, have the following composition, which is shown in Table 3.

Table 3

| Copolymer No. | Polyester in % by weight | Styrene in % by weight | Methyl methacrylate in % by weight | Hydroxyethyl methacrylate in % by weight | Hydroxyethyl acrylate in % by weight |
|---|---|---|---|---|---|
| 1 | 40 | 10 | 26.5 | 23.5 | |
| 2 | 20 | 43.5 | | 36.5 | |
| 3 | 30 | 40 | | 30 | |
| 4 | 40 | 35.5 | | 24.5 | |
| 5 | 20 | 43.5 | | 36.5 | |
| 6 | 40 | 35.5 | | 24.5 | |
| 7 | 20 | 43.5 | | 36.5 | |
| 8 | 40 | 35.5 | | 24.5 | |
| 9 | 20 | 43.5 | | 6.5 | |
| 10 | 40 | 35.5 | | 24.5 | |
| 11 | 20 | 43.5 | | 36.5 | |
| 12 | 40 | 35.5 | | 24.5 | |
| 13 | 20 | 43.5 | | 36.5 | |
| 14 | 40 | 35.5 | | 24.5 | |
| 15 | 20 | 43.5 | | 36.5 | |
| 16 | 40 | 35.5 | | 24.5 | |
| 17 | 40 | 10 | 26.5 | 23.5 | |
| 18 | 40 | 10 | 29.1 | | 20.9 |
| 19 | 40 | 10 | 26.5 | 23.5 | |
| 20 | 40 | 10 | 29.1 | | 20.9 |
| 21 | 40 | 10 | 26.5 | 23.5 | |
| 22 | 40 | 10 | 29.1 | | 20.9 |
| 23 | 40 | 36.5 | | 23.5 | |
| 24 | 40 | 39.1 | | | 20.9 |
| 25 | 40 | 10 | 26.5 | 23.5 | |
| 26 | 40 | 10 | 29.1 | | 20.9 |
| 27 | 40 | 10 | 27.0 | 23.0 | |
| 28 | 41 | 9 | 26.0 | 24.0 | |
| 29 | 38 | 15 | 23.0 | 24.0 | |
| 30 | 40 | 10 | 26.5 | 23.5 | |

The following are the proportions, as percentages by weight, in the mixture of copolymerised monomers contained in the copolymers illustrated in Tables 2 and 3:

Table 4

| | Mixture of monomers from $b_1$) | | Mixture of monomers from $b_2$) | |
|---|---|---|---|---|
| Copolymer No. | Styrene % by weight | Methyl methacrylate % by weight | Hydroxyethyl methacrylate % by weight | Hydroxyethyl acrylate % by weight |
| 1 | 16.68 | 44.16 | 39.16 | |
| 2 | 54.37 | | 45.63 | |
| 3 | 57.14 | | 42.86 | |
| 4 | 59.16 | | 40.84 | |
| 5 | 54.37 | | 45.63 | |
| 6 | 59.16 | | 40.84 | |
| 7 | 54.37 | | 45.63 | |
| 8 | 59.16 | | 40.84 | |
| 9 | 54.37 | | 45.63 | |
| 10 | 59.16 | | 40.84 | |
| 11 | 54.37 | | 45.63 | |
| 12 | 59.16 | | 40.84 | |
| 13 | 54.37 | | 45.63 | |
| 14 | 59.16 | | 40.84 | |
| 15 | 54.37 | | 45.63 | |
| 16 | 59.16 | | 40.84 | |
| 17 | 16.68 | 44.16 | 39.16 | |
| 18 | 16.68 | 48.5 | | 34.82 |
| 19 | 16.68 | 44.16 | 39.16 | |
| 20 | 16.68 | 48.5 | | 34.82 |
| 21 | 16.68 | 44.16 | 39.16 | |
| 22 | 16.68 | 48.5 | | 34.82 |
| 23 | 60.84 | | 39.16 | |
| 24 | 65.18 | | | 34.82 |
| 25 | 16.68 | 44.16 | 39.16 | |
| 26 | 16.68 | 48.5 | | 34.82 |
| 27 | 16.68 | 45.0 | 38.32 | |
| 28 | 15.25 | 44.06 | 40.69 | |
| 29 | 24.21 | 37.1 | 40.69 | |
| 30 | 16.68 | 44.16 | 39.16 | |

When the new copolymers are used in reactive lacquers, the components A and B are preferably used in the following quantities:

A. 60 to 80% by weight of copolymers containing hydroxyl groups, manufactured in accordance with the invention, B. 20 to 40% by weight of aliphatic triisocyanate.

In order to demonstrate the technical progress achieved, the curing of the lacquer films at room temperature is determined, as a function of time and at a stoving temperature of 80° C. for 30 minutes, by means of the pendulum hardness (PH), determined by Konig's method. In addition, the "pot life" of the lacquer solution and the solids content of the lacquer solution were determined. For this purpose, the reactive lacquers listed in Table 5 and prepared according to the invention from copolymers 1-30, were mixed with 1% by weight of diethylethanolamine, relative to copolymer, and with the aliphatic triisocyanate which is obtained by reacting* 3 mols of hexamethylene diisocyanate and 1 mol of water. Relative to the solids content, the mixing ratios of the copolymers with the polyisocyanate were 65% by weight of copolymer: 35% by weight of polyisocyanate. The mixtures were diluted with a solvent mixture consisting of xylene and butyl acetate in a weight ratio of 1:1, to a viscosity of 25 seconds flow time at 23° C., measured in a DIN cup having a 4 mm flow orifice, and the increase in viscosity was determined as a function of time. In order to determine the pendulum hardness, wet films 90 μm thick are applied to sheets of glass and are dried. The solids content of the lacquer solution was determined at 125° C. after 60 minutes.

(*) A commercially available product, Desmodur N glycol acetate, 2 g of silicone oil OL, dissolved to form a 10% strength solution in xylene, and 40 g of an organic triisocyanate which is dissolved to form a 75% strength solution in xylene and ethylglycol acetate, in a weight ratio of 1:1, and which has a NCO content of 16 to 17% by weight and which has been prepared from 3 mols of hexamethylene diisocyanate and 1 mol of water. The lacquer combination according to the invention is diluted with 10 parts by weight of a mixture of butyl acetate and ethylglycol acetate, in a weight ratio of 1:1, to give a flow time of 25 seconds, measured at 25° C. according to DIN 53,211, in a flow cup having a 4 mm orifice. The clear lacquer, ready for spraying, is then applied at a dry film layer thickness of 40-45 μm to an undercoating containing aluminium bronze and is dried in the air for 10 days or for 30 minutes at 80° C. The properties, from the point of view of lacquer technology, of the resulting coating are listed in Table 6.

EXAMPLE 29

27 g of copolymer solution 1, 26.5 g of chrome yellow Supra 600 L of Messrs. Siegle & Co. of Stuttgart, 0.4 g of diethylethanolamine, 0.2 g of dibutyl-tin dilaurate, dissolved to form a 1% strength solution in xylene, 2 g of Bentone 38 of Messrs. Kronos Titan GmbH of Leverkusen, as a 10% strength suspension in 86 parts by weight of xylene and 4 parts by weight of anti-settling Table 5

| | | Reactive lacquers | | | | | | |
|---|---|---|---|---|---|---|---|---|
| | | Pendulum hardness by Konig's method, in seconds | | | | | | |
| Example | Copoly- | Stoving temperature 80° C. for 30 minutes after | | Drying in the air | | | Flow time after 4 hours | Solids content of the lacquer |
| 1 to 27 | mer | 1 d | 5 d | 1 d | 5 d | 8 d | at 23° C. | solution |
| 1 | 1 | 119 | 216 | 84 | 206 | 213 | 46 | 58.2% |
| 2 | 2 | 196 | 218 | | | | 45 | 57.2% |
| 3 | 3 | 187 | 210 | 105 | 191 | 206 | 40 | 58.0% |
| 4 | 4 | 140 | 200 | 93 | 174 | 199 | 35 | 59.4% |
| 5 | 5 | 187 | 205 | 102 | 184 | 202 | 45 | 56.8% |
| 6 | 6 | 147 | 195 | 51 | 141 | 185 | 45 | 60.5% |
| 7 | 7 | 185 | 205 | 121 | 200 | 205 | 50 | 55.8% |
| 8 | 8 | 129 | 185 | 59 | 142 | 180 | 39 | 59.2% |
| 9 | 9 | 200 | 210 | 95 | 160 | 202 | 42 | 55.5% |
| 10 | 10 | 158 | 181 | 41 | 123 | 173 | 38 | 59.2% |
| 11 | 11 | 198 | 203 | 118 | 196 | 200 | 48 | 55.2% |
| 12 | 12 | 163 | 178 | 51 | 150 | 183 | 42 | 58.0% |
| 13 | 13 | 196 | 205 | 132 | 186 | 204 | 41 | 54.0% |
| 14 | 14 | 168 | 185 | 90 | 170 | 182 | 42 | 56.1% |
| 15 | 15 | 201 | 206 | 134 | 186 | 202 | 46 | 51.5% |
| 16 | 16 | 187 | 203 | 98 | 175 | 198 | 45 | 52.6% |
| 17 | 17 | 109 | 202 | 33 | 192 | 203 | 42 | 60.5% |
| 18 | 18 | 89 | 214 | 21 | 189 | 196 | 44 | 58.7% |
| 19 | 19 | 142 | 213 | 30 | 163 | 178 | 38 | 60.2% |
| 20 | 21 | 68 | 135 | 17 | 25 | 137 | 35 | 61.0% |
| 21 | 22 | 38 | 157 | 11 | 151 | 165 | 40 | 58.7% |
| 22 | 25 | 160 | 220 | 50 | 192 | 206 | 42 | 60.0% |
| 23 | 26 | 126 | 215 | 38 | 190 | 208 | 44 | 59.8% |
| 24 | 27 | 85 | 180 | 17 | 110 | 140 | 37 | 61.2% |
| 25 | 28 | 90 | 185 | 21 | 115 | 155 | 40 | 60.3% |
| 26 | 29 | 92 | 188 | 23 | 120 | 160 | 41 | 60.0% |
| 27 | 30 | 138 | 201 | 30 | 160 | 188 | 44 | 58.8% |

1 d = 1 day

EXAMPLE 28

80 g of copolymer solution 1, dissolved to form a 70% strength solution in a mixture of an aromatic solvent and ethylglycol acetate, in a weight ratio of 3:1, are mixed with 0.6 g of diethylethanolamine, 0.3 g of dibutyl-tin dilaurate, dissolved to form a 1% strength solution in xylene, 11.4 g of butyl acetate, 5.7 g of ethyl-agent (Bykumen), 5.4 g of butyl acetate and 5 g of ethylglycol acetate are weighed out into a stirred ball mill and are dispersed to give a particle size of <10 μm. 26.5 g of copolymer solution 1, 5 g of butyl acetate, 2 g of silicone oil OL of Messrs. Bayer of Leverkusen, dissolved to form a 10% strength solution in xylene, and 27 g of an organic triisocyanate having a NCO content of 16 to 17% by weight are then mixed in. The lacquer combination according to the invention is diluted with 1.5 g of butyl acetate and 1.5 g of ethylglycol acetate to a flow time of 25 seconds, measured at 25° C. according to DIN 53,211, in a flow cup having an orifice of 4 mm. The pigmented lacquer, ready for spraying, is then applied at a dry film layer thickness of 40-45 μm to a steel sheet which has been primed and treated with a filler, and drying is carried out in the air for 10 days or for 30 minutes at 80° C. The properties, from the point of view of lacquer technology, are listed in Table 6.

Table 6

|  | Clear lacquer Example 28 | Yellow top lacquer Example 29 |
|---|---|---|
| Drying in the air and in an oven, determined by pendulum hardness measured by Konig's method |  |  |
| after 24 hours | 81 seconds | 63 seconds |
| after 10 days | 170 seconds | 178 seconds |
| after 30 minutes at 80° C. | 60 seconds | 42 seconds |
| after a further 24 hours drying in the air | 160 seconds | 113 seconds |
| Solids, content, determined at 125° C. after 1 hour, of the lacquer, ready for spraying | 57.5% | 65% |
| Erichsen deep-drawing value | 7.9 mm | 7.9 mm |
| Mandrel bending test* | 0 | 0 |
| Resistance to xylene after exposure for 6 minutes* | 0 | 0 |
| Gloss determination by Gardner's method, 60° angle | 99% | 94% |
| Gloss retention in an Atlas weatherometer with a 6,000 watt xenon lamp and inner and outer quartz filter, exposure time 200 hours | 90% | 83% |
| Crazing formation in the lacquers according to the invention* | 0 | 0 |

*0 = highest value
5 = lowest value

In the absence of crosslinking catalysts the reactive lacquers of the invention are stable to storage at room temperature for about 2 days. When stored at 0° to −5° C., the reactive lacquers of the invention can be stored in a usable condition for 10 to 14 days in the absence of crosslinking catalysts.

The reactive lacquers are catalysed, for example with 1% by weight of diethylethanolamine, in order to bring about crosslinking at room temperature. The processing time of these catalysed reactive lacquers is about 4 hours, that is to say the viscosity of the reactive lacquer mixture increases from an initial flow time of 25 seconds, measured at 23° C. in a DIN cup having a 4 mm flow orifice, to a maximum flow time of 50 seconds. In order to prevent the freshly-mixed, catalysed reactive lacquer mixture from gelling, the lacquer can be stored for several days in a refrigerator at 0° to −5° C. without any increase in viscosity being detectable. A residue of a ready-to-use catalysed reactive lacquer which is still available at the end of a working day and which has already lost its workability through increasing viscosity, but has not yet gelled, can be stored at 0° to −5° C. or lower and can be re-processed to give a ready-to-use reactive lacquer by adding fresh components A and B, so that losses of lacquer due to exceeding the pot life can be avoided in this way.

We claim:

1. A reactive lacquer composition comprising polymers containing hydroxyl groups, a polyisocyanate, and a solvent with no active hydrogen atom, characterized in that this reactive lacquer contains as the binder component
    (A) 60-80 percent by weight of a copolymer which has hydroxyl groups and hydroxyl numbers of 130 to 200 and which is prepared by copolymerizing:
        (a) 20 to 45 percent by weight of unsaturated polyesters having acid numbers of 10 to 20 and having hydroxyl numbers of 100 to 250, which polyesters are synthesized from saturated dicarboxylic acids having 6 to 10 carbon atoms, unsaturated dicarboxylic acids having 4 carbon atoms or the anhydrides thereof, and diols having 2–15 carbon atoms, it being possible for the saturated dicarboxylic acids having 6–10 carbon atoms to be replaceable, to the extent of up to 20 percent, by saturated, dimeric fatty acids which have 36 carbon atoms and contain two carboxyl groups, together with
        (b) 55–80 percent by weight of a mixture of monomers composed of $\alpha,\beta$-ethylenically unsaturated compounds, with the proviso that the percentage by weight of the mixture of monomers add to 100 percent by weight, the said mixture of monomers consisting of
            ($b_1$) 50–70 percent by weight of at least one of styrene and methyl methacrylate and
            ($b_2$) 30–50 percent by weight of at least one of hydroxyethyl acrylate, hydroxyethyl methacrylate, hydroxypropyl acrylate, and hydroxy-n-butyl acrylate,
        the components a and b being employed in such quantities that their total adds up to 100 percent by weight and with the proviso that the components $b_1$ and $b_2$ in the mixture b of monomers add up to 100 percent by weight, and the additional condition that the copolymers have hydroxyl numbers of 130 to 200, and
    (B) 20–40 percent by weight of an organic polyisocyanate are employed, with the proviso that A and B together give numerical values of 100 percent by weight.

2. A reactive lacquer composition according to claim 1, characterized in that this lacquer contains, as the binder component
    (A) 63–68 percent by weight of the copolymers which contain hydroxyl groups and
    (B) 32–37 percent by weight of an organic polyisocyanate.

3. A reactive lacquer composition according to claim 1, characterised in that the component A is present in the form of a solution consisting of 20–35 percent by weight of an inert organic solvent and 65–80 percent by weight of copolymers, with the proviso that the percentages by weight add up to 100 percent.

4. A reactive lacquer composition according to claim 1, characterized in that the component A consists of a copolymer which has a hydroxyl number of 140 to 175 and which has been prepared by copolymerizing a mixture consisting of (a) 20–45 percent by weight of unsaturated polyesters having hydroxyl numbers of 150–240, formed from 28–60 percent by weight of saturated dicarboxylic acids having 6 to 10 carbon atoms, 2–20 percent by weight of unsaturated dicarboxylic acids having 4 carbon atoms or the anhydrides thereof and 38–70 percent by weight of diols having 2–4 carbon atoms, and (b) 55–80 percent by weight of a mixture of monomers composed of α,β-ethylenically unsaturated compounds, with the proviso that the percentages by weight add up to 100 percent.

* * * * *

UNITED STATES PATENT AND TRADEMARK OFFICE
CERTIFICATE OF CORRECTION

PATENT NO. : 4,172,060

DATED : October 23, 1979

INVENTOR(S) : Dalibor et al.

It is certified that error appears in the above—identified patent and that said Letters Patent is hereby corrected as shown below:

Col. 3, line 64; "Weight" should read -- weight --
Col. 5, line 56; "formation" should read -- formulation --
Col. 8, line 1; "1,3,-" should read -- 1,3- --
Table 1 - Continued, last column, line 5; "I-U" should read -- T-U --
Table 2 - Continued, second to last column, last line of table; "H" should read -- J --
Table 3, second to last column, line 15 of table (copolymer No. 9); "6.5" should read -- 36.5 --
Col. 15, line 5; "Konig's" should read -- König's"
Table 5, second heading; "Konig's" should read -- König's --
Table 5, column 5d, line 25 in table; "25" should read -- 125 --
Table 6, first column, line 3; "Konig's" should read -- König's --

Signed and Sealed this

Fifth Day of February 1980

[SEAL]

Attest:

SIDNEY A. DIAMOND

Attesting Officer

Commissioner of Patents and Trademarks